Oct. 11, 1932.  A. F. EDOUART  1,882,413
FILM SPOOL
Filed July 12, 1930
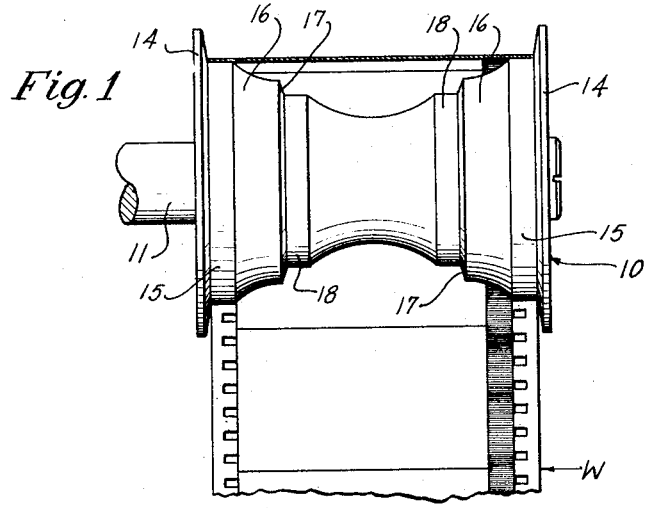
Fig. 1
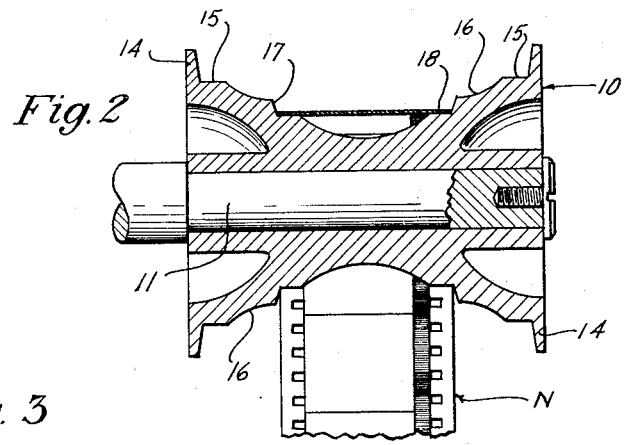
Fig. 2
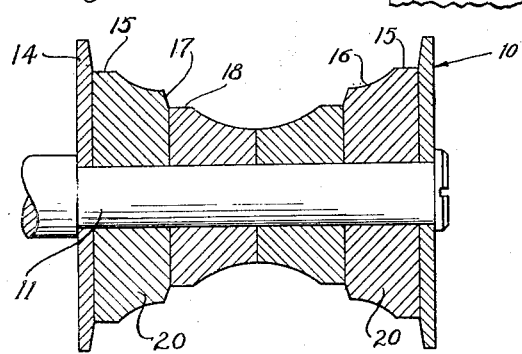
Fig. 3
Inventor
Alexander Farciot Edouart
Attorney Patented Oct. 11, 1932

1,882,413

UNITED STATES PATENT OFFICE

ALEXANDER FARCIOT EDOUART, OF LOS ANGELES, CALIFORNIA, ASSIGNOR TO PARAMOUNT PUBLIX CORPORATION, OF LOS ANGELES, CALIFORNIA, A CORPORATION OF NEW YORK

FILM SPOOL

Application filed July 12, 1930. Serial No. 467,493.

This invention relates generally to motion picture film spools or sprockets, it being the object of the invention to provide a film spool or sprocket suitably adapted to carrying films of more than one width. It may be stated that the invention is equally applicable to spools and sprockets, and for simplicity only spools will hereinafter be referred to, as a sprocket is but a spool with teeth added.

At the present time there are in use in the motion picture art films of several widths, for instance, the old-standard 35 mm. film, and several wide films of sizes ranging between 60 and 70 mm. in width. It is costly and generally disadvantageous to provide separate machines each equipped with spools for handling film of but a single width, and it is inconvenient and impractical to change spools every time a film of different width is run through a machine.

Accordingly, I have provided a single spool adapted for handling films of more than one width, this spool having outside flanges and film treads for the wider film, and between and sunk below said film treads another pair of flange portions and film treads for a narrower film.

The invention will be readily understood from the following detailed description of a present preferred embodiment thereof, reference for this purpose being had to the accompanying drawing, in which:

Fig. 1 is an elevation of the spool showing a wide film carried thereby;

Fig. 2 is a longitudinal section of the spool showing a narrow film carried thereby; and Fig. 3 is a longitudinal section showing a variational form of spool.

Referring now to the drawing, the numeral 10 designates the spool mounted on a spindle 11. The spool is provided with outside flanges 14 and adjacent thereto are usual film treads 15 for the wide film W. Below treads 15 the spool is recessed, as at 16, to clear the central portion of the wide film. Below recesses 16 are sunk flange faces 17 and adjacent thereto are film treads 18 for the narrow film N, and between treads 18 the spool is recessed to clear the central portion of the narrow film.

A wire film W can by this arrangement be run over the outside film treads between the outside flanges without interference from the narrow-film provisions, and a narrow film N can run over the sunk, inside treads between the sunk flanges without interference from the wide-film provisions. And it will be obvious that in certain situations, for instance in developing machines, it may be desirable to run both a wide and a narrow film at once over the same spool, to which use my spool is adapted.

Moreover, it will readily be understood how the arrangement can, if desired, be carried further to provide for more than two films.

The use of an assembled spool composed of a plurality of parts, as shown in Fig. 3, is also contemplated, though a greater or lesser number of parts than shown may be used. In this case, the spool, generally indicated at 10, may be divided into such sections as may be required by the manufacture, the object being to obtain smooth peripheral surfaces that are not broken by the ridge formed at the parting of the moulds. A further advantage arises from the use of a built up spool in that by varying the thickness of the section 20 having the treads 15, the spool may be accommodated to wide films of varying width.

It will be understood the drawing and description are to be considered merely as illustrative of and not restrictive on the broader claims appended hereto, for various changes in design, structure and arrangement may be made without departing from the spirit and scope of said claims.

I claim:

1. A film spool or the like having outside flanges, shoulders of relatively steep pitch on the inside of the flanges, cylindric film treads immediately inside said shoulders and spaced for a relatively wide film, curvilinear recessed surfaces immediately inside said film treads, shoulders of relatively steep pitch immediately inside said curvilinear surfaces, cylindric film treads immediately inside the second mentioned shoulders and of a diameter less than the smallest diameter of said curvilinear surfaces, the second mentioned film treads being spaced for a relatively narrow film, and a curvilinear recessed surface immediately inside and between the second mentioned film treads.

2. A film spool or the like having outside flanges, shoulders of relatively steep pitch on the inside of the flanges, cylindric film treads immediately inside said shoulders and spaced for a relatively wide film, curvilinear recessed surfaces immediately inside said film treads, shoulders of relatively steep pitch immediately inside said curvilinear surfaces, cylindric film treads immediately inside the second mentioned shoulders and of a diameter less than the smallest diameter of said curvilinear surfaces, the second mentioned film treads being spaced for a relatively narrow film, and a curvilinear recessed surface immediately inside and between the second mentioned film treads; and the spool comprising the following parts: a pair of outside flanges forming the flanges and first mentioned shoulders, a pair of intermediate sections forming the first mentioned film treads and adjoining curvilinear surfaces and the second mentioned shoulders, and a central pair of sections forming the second mentioned film treads and adjoining curvilinear surface.

3. A film spool, assembled from a plurality of individual sections, comprising a pair of central sections having peripheries adapted to form film treads spaced for a relatively narrow film, a pair of intermediate sections of larger diameter than the central sections and disposed one on each side of the central sections and in fixed lateral relation thereto, said intermediate sections having peripheries adapted to form film treads spaced for a relatively wide film, a flange section at each end of the spool, and a spindle upon which the sections are mounted; said intermediate sections being removable to permit replacement with others of different lateral thickness to permit adjustment of the treads to the width of film passed thereover.

In witness that I claim the foregoing I have hereunto subscribed my name this 9th day of May 1930.

ALEXANDER FARCIOT EDOUART.